United States Patent
Wu et al.

(10) Patent No.: US 9,530,190 B2
(45) Date of Patent: Dec. 27, 2016

(54) IMAGE DENOISING METHOD AND IMAGE DENOISING APPARATUS

(71) Applicant: FUJITSU LIMITED, Kawasaki-shi, Kanagawa (JP)

(72) Inventors: Jianrong Wu, Beijing (CN); Zhiming Tan, Beijing (CN); Akihiro Higashi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/721,186

(22) Filed: May 26, 2015

(65) Prior Publication Data

US 2015/0339806 A1 Nov. 26, 2015

(30) Foreign Application Priority Data

May 26, 2014 (CN) .......................... 2014 1 0226763

(51) Int. Cl.
*G06K 9/40* (2006.01)
*G06T 5/00* (2006.01)
(Continued)

(52) U.S. Cl.
CPC ............... *G06T 5/002* (2013.01); *H04N 5/213* (2013.01); *H04N 5/232* (2013.01);
(Continued)

(58) Field of Classification Search
CPC .......... G06T 5/002; G06T 5/003; G06T 5/005; G06T 5/10; G06T 5/50; G06T 2207/10004; G06T 2207/20016; G06T 2207/20021; G06T 2207/20036; G06T 2207/20052; G06T 2207/20076; G06T 2207/20192; G06T 2207/20024; H04N 19/00; H04N 19/117; H04N 19/147; H04N 19/159; H04N 19/176; H04N 19/18; H04N 19/192; H04N 19/196; H04N 5/213; H04N 5/232; H04N 19/56; H04N 19/567; H04N 19/61; H04N 19/82; H04N 19/86; A61B 5/040017; A61B 5/7203; A61B 6/5258

See application file for complete search history.

(56) References Cited

U.S. PATENT DOCUMENTS

| 7,587,099 | B2 * | 9/2009 | Szeliski | ................... G06T 5/003 348/241 |
| 8,605,970 | B2 * | 12/2013 | Bar-Aviv | .................. G06T 5/50 378/4 |
| 2014/0200823 | A1 * | 7/2014 | Zeng | .................. A61B 5/04017 702/19 |

OTHER PUBLICATIONS

Extended European Search Report dated Oct. 13, 2015 in corresponding European Patent Application No. 15168639.1.
(Continued)

*Primary Examiner* — Jose Couso
(74) *Attorney, Agent, or Firm* — Staas & Halsey LLP (57) ABSTRACT

The present invention provides an image denoising method and an image denoising apparatus. The image denoising method includes performing preliminary denoising processing to an acquired image to be processed, so as to obtain a preliminarily denoised image; calculating a residual quantity corresponding to a central pixel of each unit area in the image to be processed according to numerical values of specific energy parameters to which the image to be processed and the preliminarily denoised image correspond, respectively; and using the residual quantity to calculate a weight matrix corresponding to each unit area, and performing non-local mean value calculation to the image to be processed according to the weight matrix, so as to realize the denoising processing of the image to be processed. The image denoising method is able to denoise effectively, and make a denoised image more visually natural.

10 Claims, 4 Drawing Sheets

(51) Int. Cl.
    *H04N 5/213*    (2006.01)
    *H04N 5/232*    (2006.01)
(52) U.S. Cl.
    CPC .............. *G06T 2207/10004* (2013.01); *G06T 2207/20024* (2013.01); *G06T 2207/20052* (2013.01)

(56) References Cited

OTHER PUBLICATIONS

Li, "An improved Non-Local Filter for Image Denoising", IEEE, 2009, 4 pp.
Xiong et al., "Structural Similar Patches for Nonlocal-means with Modified Robust M-estimator and Residual Images", Proceedings of the 2011 IEEE International Conference on Mechatronics and Automation, Aug. 7-10, Beijing, China, pp. 709-714.
Zhou et al., "An Effective Method for Signal Extraction from Residual Image, with Application to Denoising Algorithms", ISNN 2013, Part I, LNCS 7951, pp. 657-663, 2013.
Brunet et al., "The Use of Residuals in Image Denoising", ICIAR 2009, LNCS 5627, pp. 1-12, 2009.
Dabov et al., "Image Denoising by Sparse 3-D Transform-Domain Collaborative Filtering", IEEE Transactions on Image Processing, vol. 16, No. 8, Aug. 2007, pp. 2080-2095.
Coupé et al., "Nonlocal Means-Based Speckle Filtering for Ultrasound Images", IEEE Transactions on Image Processing, vol. 18, No. 10, Oct. 2009, pp. 2221-2229.
Milanfar, "A Tour of Modern Image Filtering", IEEE Signal Processing Magazine, Jan. 2013, pp. 106-128.

\* cited by examiner

IMAGE DENOISING METHOD AND IMAGE DENOISING APPARATUS

CROSS-REFERENCE TO RELATED APPLICATIONS

This application claims the benefit of Chinese Application No. 201410226763.8, filed May 26, 2014, in the Intellectual Property Office, the disclosure of which is incorporated herein by reference.

BACKGROUND

1. Field

The present invention relates to the field of image processing, and in particular to an image denoising method and an image denoising apparatus.

2. Description of the Related Art

As the development and popularity of digital cameras and scanners, it is very easy to obtain digital images. However, any sensor in the real world is subjected to noise to a certain extent, such as heat, electric power, or other substances. Noise may damage real measurement of a signal, resulting in that any image data include signals and noise. Various applications related to images, such as medical image analysis, image segmentation, and subject detection, etc., basically need use of an effective noise suppression method to further generate reliable results. Hence, in image processing and computer visualization, image filtering has become an important and wide studies technology. A gray scale image is an important and commonly-used image, and its noise filtering method is extremely important.

Currently, there exist some denoising methods to attempt to filter noise of a gray scale image, such as a wavelet analysis method based on a threshold, a non-local mean value method, a Gaussian filtering method, and a bilateral filtering method.

In the wavelet analysis method based on a threshold, wavelet transform is applied to an original image, and the original image is converted into the wavelet domain, and a threshold method is used to filter multiband wavelet coefficients, which are usually a diagonal detail coefficient, a horizontal detail coefficient and a vertical detail coefficient, in a first decomposed stage. Wherein, a threshold value method is understood as a hard-thresholding function, all the detail coefficients less than the threshold value are set to be 0, and the remaining detail coefficients are reserved. Finally, after processing by using the threshold value method, all the wavelet coefficients are returned back to the image domain through wavelet transform. The wavelet analysis method based on a threshold may suppress noise, but at the same time, some details in the image are also suppressed.

The non-local mean value method is a nonlinear edge protection filtering method, in which each output pixel is calculated as a weighted sum of input pixels. A group of input pixels contributing to an output pixel are from a large area in an input image, hence it is referred to as non-localization. A key feature in a local mean value method is that a weight is determined according to a distance between small image blocks. This method is able to reserve details in an image and suppress high-frequency Gaussian noise. However, such a filtering method is not applicable to a real scenario where noise is severe and higher than the Gaussian noise.

The Gaussian filtering method is a weighted mean method. Each output pixel is set as a weight mean value of neighboring pixels of the pixel, a luminance value of an original pixel obtains a maximum weight, and the neighboring pixels obtain a relatively small weight according to increase of distance between them and the original pixel. After image filtering, noise is decreased, but at the same time, details in the images are also decreased.

The bilateral filtering method is an edge protection method and a denoising filtering method. A luminance value of each pixel in an image is replaced with a weight mean value of luminance values of its adjacent pixels. This weight is based on Gaussian distribution. What is crucial is that the weight depends not only on a Euclidean distance, but also on a radiometric difference. Clear edges may be reserved by systematically traversing each pixel and granting weights to corresponding neighboring pixels. If an image is serious affected by noise, this method makes the edges looked false and unnatural.

SUMMARY

Additional aspects and/or advantages will be set forth in part in the description which follows and, in part, will be apparent from the description, or may be learned by practice of the invention.

In the light of the above, the present invention provide an image denoising method, an image denoising apparatus and electronic equipment, so as to at least solve the problem in an existing denoising technology that a denoised image cannot be looked more natural.

According to an aspect of embodiments of the present invention, there is provided an image denoising method, comprising: performing preliminary denoising processing to an acquired image to be processed, so as to obtain a preliminarily denoised image; calculating a residual quantity corresponding to a central pixel of each unit area in the image to be processed according to numerical values of specific energy parameters to which the image to be processed and the preliminarily denoised image correspond, respectively; and using the residual quantity to calculate a weight matrix corresponding to each unit area, and performing non-local mean value calculation to the image to be processed according to the weight matrix, so as to realize the denoising processing of the image to be processed.

According to another aspect of embodiments of the present invention, there is provided an image denoising apparatus, comprising: a preliminary denoising unit configured to perform preliminary denoising processing to an acquired image to be processed, so as to obtain a preliminarily denoised image; a residual quantity calculating unit configured to calculate a residual quantity corresponding to a central pixel of each unit area in the image to be processed according to numerical values of specific energy parameters to which the image to be processed and the preliminarily denoised image correspond, respectively; and a non-local mean value calculating unit configured to use the residual quantity to calculate a weight matrix corresponding to each unit area, and perform non-local mean value calculation to the image to be processed according to the weight matrix, so as to realize the denoising processing of the image to be processed.

According to still another aspect of embodiments of the present invention, there is provided electronic equipment, comprising the above-described image denoising apparatus.

According to further still another aspect of embodiments of the present invention, there is provided a program product storing machine-readable instruction codes, which enables the machine to carry out the above-described image denoising method when being executed.

According to yet still another aspect of embodiments of the present invention, there is provided a computer-readable storage medium, in which the above-described program product is stored.

In the above-described image denoising method, image denoising apparatus and electronic equipment, by using the residual quantity of a central pixel of each unit area to calculate a weight matrix of each unit area, and performing non-local mean value calculation to the image to be processed according to the weight matrix, at least one of the following advantages may be achieved: detail features of an image may be reserved as possible, and the denoised image is looked more natural.

BRIEF DESCRIPTION OF THE DRAWINGS

The present invention shall be better understood with reference to the following description in combination with the accompanying drawings, in which like or similar reference numerals are used in all the accompanying drawings to designate like or similar parts. The accompanying drawings and the following description are contained in the specification and constitute a part of the specification and illustrate the preferred embodiments of the present invention, and are used for setting forth the principles of the present invention together with the description.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

In order that the above objects, features and advantages of the present invention to be understood more clearly, the present invention shall be further described below in detail with reference to the accompanying drawings and embodiments. It should be noted that the embodiments of this application and features in these embodiments may be combined without collision.

Many details are explained in the following description for fully understanding the present invention. However, the present invention may be carried out in other manners than those described herein. Therefore, the present invention is not limited to the particular embodiments disclosed below.

Figure 1:
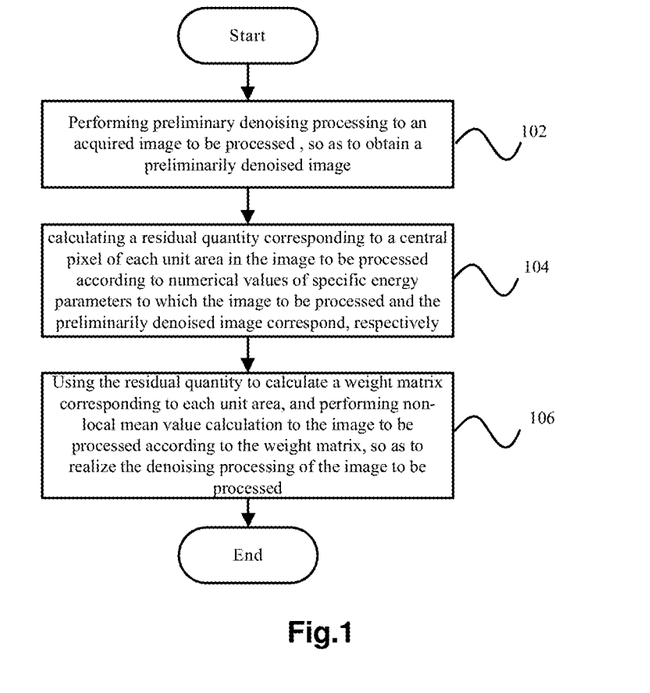
FIG. 1 shows a flowchart of the image denoising method according to an embodiment of the present invention.

FIG. 1 shows a flowchart of the image denoising method according to an embodiment of the present invention.

As shown in FIG. 1, the image denoising method according to the embodiment of the present invention may include the steps of:

step 102: performing preliminary denoising processing to an acquired image to be processed (i.e. an original image), so as to obtain a preliminarily denoised image;

step 104: calculating a residual quantity corresponding to a central pixel of each unit area in the image to be processed according to numerical values of specific energy parameters to which the image to be processed and the preliminarily denoised image correspond, respectively; and step 106: using the residual quantity to calculate a weight matrix corresponding to each unit area, and performing non-local mean value calculation to the image to be processed according to the weight matrix, so as to realize the denoising processing of the image to be processed.

In this embodiment, the residual quantity is obtained by using the preliminarily denoised image and the original image and may be understood as a quantity of a difference between image information before and after denoising. The weight matrix is calculated according to the residual quantity and the non-local mean value calculation is performed to the original image according to the weight matrix, thereby avoiding problems in the prior art that image detail information generated in directly denoising the original image is neglected and edge distortion is serious.

The image denoising method according another embodiment of the present invention shall be described below in detail with reference to FIG. 2.

Figure 2:
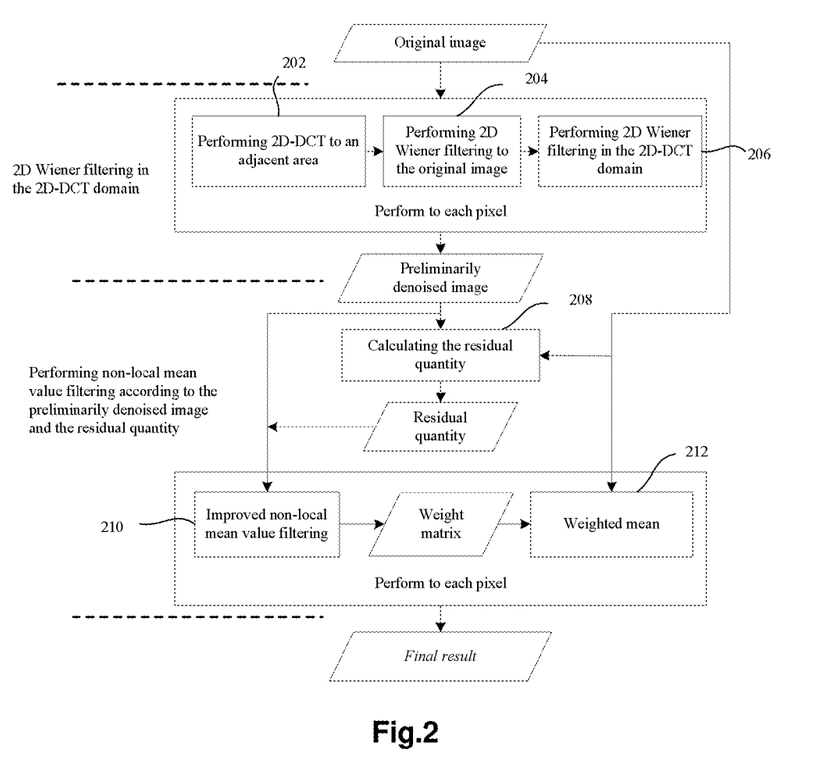
FIG. 2 shows a flowchart of the image denoising method according to another embodiment of the present invention.

As shown in FIG. 2, step 202: performing two-dimensional discrete cosine transform (2D-DCT) to an adjacent area of a selected pixel.

Figure 3:
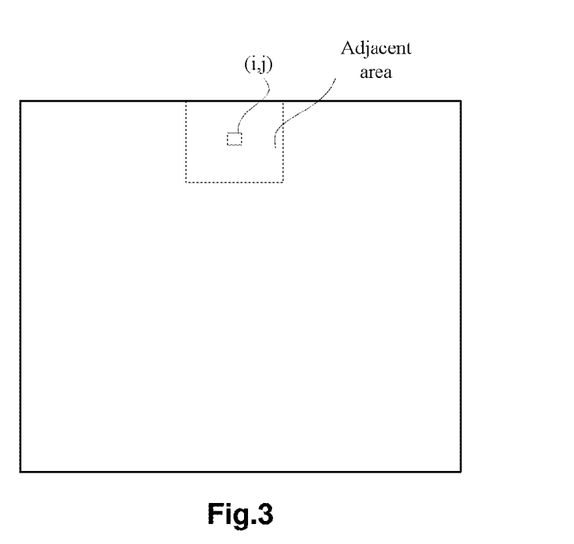
FIG. 3 shows a schematic diagram of an adjacent area of each pixel according to an embodiment of the present invention.
Figure 4:
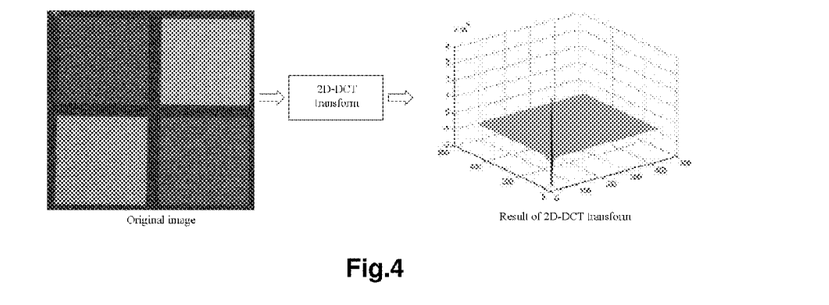
FIG. 4 shows a schematic diagram of performing 2D-DCT conversion to an original image according to an embodiment of the present invention.

For a pixel x (i, j), its adjacent area (the adjacent area shown in FIG. 3) is transformed to a discrete cosine transform domain, a schematic diagram of the transform being as shown in FIG. 4, and two-dimensional Wiener filtering as described below is performed.

The two-dimensional discrete cosine transform and its inverse transform process are described in formulae 1.1.1 to 1.1.3.

$$D(u, v) = DCT[I(x, y)] = \qquad (1.1.1)$$
$$a(u)a(v)\sum_{x=0}^{M-1}\sum_{y=0}^{N-1} I(x, y)\cos\left[\frac{(2x+1)u\pi}{2M}\right]\cos\left[\frac{(2y+1)v\pi}{2N}\right];$$

$$I_D(x, y) = IDCT[D(u, v)] = \qquad (1.1.2)$$
$$\sum_{u=0}^{M-1}\sum_{v=0}^{N-1} a(u)a(v)D(u, v)\cos\left[\frac{(2x+1)u\pi}{2m}\right]\cos\left[\frac{(2y+1)v\pi}{2N}\right];$$

where, $x, u = 0, 1, \ldots M - 1, y, v = 0, 1, \ldots N - 1$;

$$\begin{cases} a(0) = \sqrt{\frac{1}{N}} \\ a(u) = \sqrt{\frac{2}{N}} \quad u = 1, 2, \ldots, M \\ a(v) = \sqrt{\frac{2}{M}} \quad v = 1, 2, \ldots, N \end{cases} \qquad (1.1.3)$$

where, M and N are a height value and a width value of the original image.

Step 204: performing two-dimensional Wiener filtering to the original image.

In this embodiment, a two-dimensional Wiener filter uses an adaptive Wiener method based on statistic data estimated according to a local adjacent area of each pixel, and the following formula is used to calculate a local mean value mean(i, j) and a variance value var(i, j):

$$\text{mean}(i, j) = \frac{\sum_{k,m \in MN} x(k, m)}{MN}; \quad (1.2.1)$$

$$\text{var}(i, j) = \frac{1}{MN}\left(\sum_{k,m \in MN}(x(k, m) - \text{mean}(i, j))^2\right); \quad (1.2.2)$$

where, (k,m) is an arbitrary address in an adjacent area of a size of N×M.

And then two-dimensional Wiener filtering is performed to pixels in the image according formula (1.2.3):

$$Wn(i, j) = \quad (1.2.3)$$
$$2DWN[x(i, j)] = \text{mean}(i, j) + \frac{\text{var}(i, j) - nv}{\text{var}(i, j)}(x(i, j) - \text{mean}(i, j));$$

where, nv is noise variance.

Figure 5:
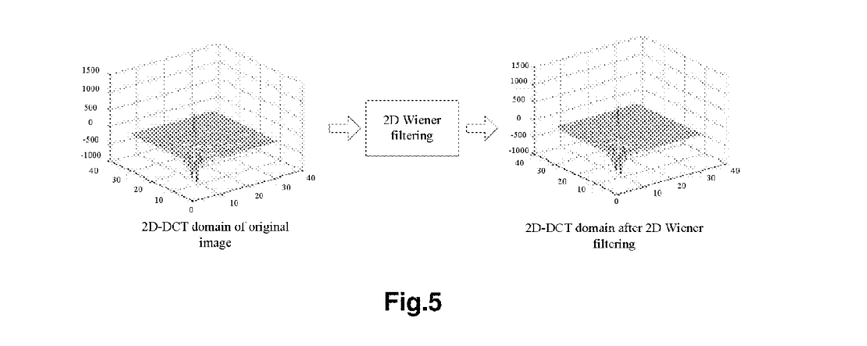
FIG. 5 shows a schematic diagram of performing two-dimensional Wiener filtering in the 2D-DCT domain according to an embodiment of the present invention.

Step 206: performing two-dimensional Wiener filtering in the two-dimensional discrete cosine transform domain of the image by using formula (1.3.1):

$$Wn(u, v) = 2DWN[d(u, v)] = \quad (1.3.1)$$
$$\text{mean}(u, v) + \frac{\text{var}(u, v) - nv}{\text{var}(u, v)}(d(u, v) - \text{mean}(u, v));$$

where, d(u,v) is a pixel in the D(u,v) (two-dimensional discrete cosine transform domain); and a schematic diagram of comparison of the two-dimensional discrete cosine transform domain before and after the two-dimensional Wiener filtering is shown in FIG. 5.

Figure 6:
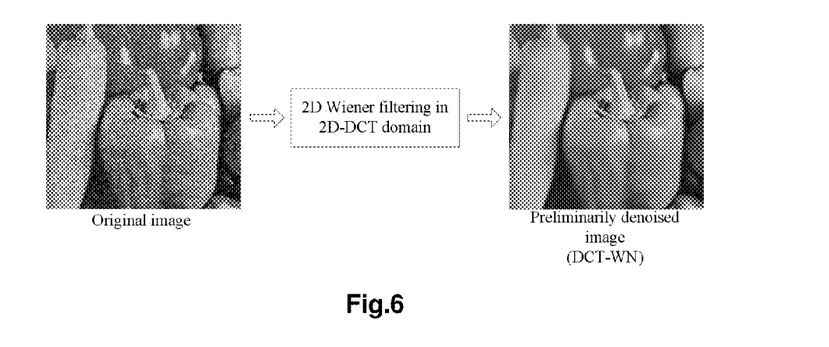
FIG. 6 shows a schematic diagram of an original image after being preliminarily denoised according to an embodiment of the present invention.

After the two-dimensional Wiener filtering is performed to each pixel in the two-dimensional discrete cosine transform domain, the preliminarily denoised image is obtained, as shown in FIG. 6.

Step 208: calculating the residual quantity of the pixel x (i, j) according to the original image and the preliminarily denoised image. In particular, the residual quantity is an absolute value of a difference between a gray scale value of the original image and a gray scale value of the preliminarily denoised image.

Step 210: calculating the weight matrix of each pixel by applying an improved non-local mean value filtering method to the residual quantity. The improved non-local mean value filtering method according to the present invention shall be described below in detail.

Figure 7:
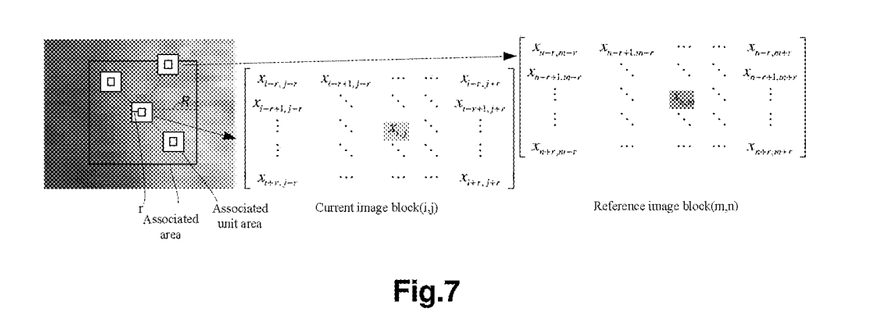
FIG. 7 shows a schematic diagram of acquiring a weight matrix of an associated unit area according to an embodiment of the present invention.

Each output pixel is defined as a weighted sum of input pixels, as shown in formula (2.2.1):

$$NL(i, j) = \sum_{n,m \in R(i,j)} x(n, m) \times w(n, m); \quad (2.2.1)$$

where, x(n,m) is a luminance value of a pixel (n, m), and w(n,m) is a corresponding weight of the luminance value x(n, m), a value of w(n, m) being determined by a distance between image areas and a residual quantity. For example, in FIG. 7, a weight of a pixel x(n,m) is determined by a residual quantity residuals(n, m) and a distance between a current image block (an arbitrary unit area) and its reference image block (multiple associated unit areas in an associated area). A process of calculating the weight w(n,m) is described in the formula below:

$$d(n, m) = \sum_{t=-r}^{r}\sum_{k=-r}^{r}\left((x(i+k, j+t) - x(n+k, m+t))^2 \Big/ \left(\frac{(k^2+t^2)^{1.25}+0.5}{T}\right)\right); \quad (2.2.2)$$

$$T = \sum_{t=-r}^{r}\sum_{t=-r}^{r}((k^2+t^2)^{1.25}+0.5); \quad (2.2.3)$$

$$w(n, m) = e^{(-(d(n,m)+residuals(n,m))/h)}. \quad (2.2.4)$$

Three coefficients, a search radius R, a radius r of the associated unit area and a control coefficient h, are defined herein. The search radius R means a range of pixels for calculating a weighted sum, such as R×R. The radius r of the associated unit area (or referred to as a reference image block) means a half of a size of the associated unit area, as shown in FIG. 7. The control coefficient h controls a denoising effect, and if more noise needs to be suppressed, a value of the control coefficient h will be increased. However, a range of the control coefficient is greater than or equal to 1 and less than or equal to 100.

It can be seen from formula (2.2.4) that if the residual quantity is large, it shows that noise of the pixel is relatively large, and the weight to which it corresponds is relatively small (the extent that it is adopted is reduced); and noise suppression becomes large after the weight becomes small. Therefore, under a condition of the same control coefficient h, different sizes of the weight embodies different extents of noise suppression, and the extents of noise suppression may be changed by changing the control coefficient h.

After processing by using formulae (2.2.2) and (2.2.1), for each pixel (i, j), the R×R weight matrix as shown below may be obtained:

$$W = \begin{bmatrix} w_{i-l,j-l} & w_{i-l+1,j-l} & \cdots & \cdots & w_{i-l,j+l} \\ w_{i-l+1,j-l} & \ddots & & \ddots & w_{i-l+1,j+l} \\ \vdots & & \ddots & w_{i,j} & \ddots & \vdots \\ \vdots & & \ddots & & \ddots & \vdots \\ w_{i+l,j-l} & \cdots & \cdots & \cdots & w_{i+l,j+l} \end{bmatrix}, R = 2 \times l + 1.$$

The weight of the pixel (i, j) should be a maximum value, and hence the weight value of the pixel (i, j) is redefined and the weight matrix is normalized:

$$w(i,j) = \max(W) \quad (2.2.5),$$

$$W = W/\max(W) \quad (2.2.6).$$

Step 212: calculating a weighted sum of all pixels in the associated area according to a relationship between each associated unit area in the associated area and a weight value in the weight matrix, so as to take it as a result after denoising the central pixel of the arbitrary unit area.

In this step, the R×R weight matrix is used to calculate a weighted sum of original images, and the pixel (i, j) of the original images is defined as OI(i, j).

After performing the non-local mean value calculation to the original image (i.e. the image to be processed) according to the weight matrix, as shown in formula (2.2.1), a final filtering result $NLM\_OI(i,j)$ may be obtained:

$$NLM\_OI(i,j) = \sum_{n,m \in R(i,j)} OI(n, m) \times w(n, m).$$

Figure 8:
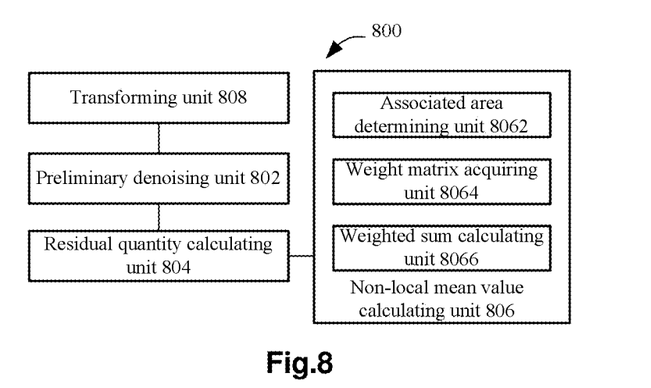
FIG. 8 shows a block diagram of the image denoising apparatus according to an embodiment of the present invention.

FIG. 8 shows a block diagram of the image denoising apparatus according to an embodiment of the present invention.

As shown in FIG. 8, the image denoising apparatus 800 according to the embodiment of the present invention may include:

a preliminary denoising unit 802 configured to perform preliminary denoising processing to an acquired image to be processed, so as to obtain a preliminarily denoised image;

a residual quantity calculating unit 804 configured to calculate a residual quantity corresponding to a central pixel of each unit area in the image to be processed according to numerical values of specific energy parameters to which the image to be processed and the preliminarily denoised image correspond, respectively; and a non-local mean value calculating unit 806 configured to use the residual quantity to calculate a weight matrix corresponding to each unit area, and perform non-local mean value calculation to the image to be processed according to the weight matrix, so as to realize the denoising processing of the image to be processed.

Wherein, the non-local mean value calculating unit 806 includes:

an associated area determining unit 8062 configured to select an arbitrary unit area in the image to be processed, and determine an associated area of the arbitrary unit area in the image to be processed; and a weight matrix acquiring unit 8064 configured to calculate a weight value corresponding to each associated unit area according to a value of a distance between each associated unit area in the associated area and the arbitrary unit area and the residual quantity, so as to obtain the weight matrix.

The weight matrix acquiring unit 8064 uses a formula below to calculate the weight value corresponding to the arbitrary associated unit area in the associated area:

$$w(n,m) = e^{(-(d(n,m) + residuals(n,m))/h)};$$

where, w(n, m) is the weight value to which an arbitrary associated unit area (n, m) corresponds, d(n, m) is the value of the distance between the arbitrary associated unit area and the arbitrary unit area, residuals(n, m) is the residual quantity corresponding to the central pixel of the arbitrary unit area, h is a predefined control coefficient.

The weight matrix acquiring unit 8064 uses a formula below to calculate the value of the distance between the arbitrary associated unit area (n, m) and the arbitrary unit area (i, j):

$$d(n, m) = \sum_{t=-r}^{r} \sum_{k=-r}^{r} \left( (x(i+k, j+t) - x(n+k, m+t))^2 / \left( \frac{(k^2 + t^2)^{1.25} + 0.5}{T} \right) \right),$$

$$T = \sum_{t=-r}^{r} \sum_{k=-r}^{r} ((k^2 + t^2)^{1.25} + 0.5);$$

where, 2r+1 is a side length of the arbitrary associated unit area, and l, k and T are intermediate values.

The non-local mean value calculating unit 806 includes:

a weighted sum calculating unit 8066 configured to calculate a weighted sum of all pixel in the associated area according to a relationship between each associated unit area in the associated area and a weight value in the weight matrix, so as to take it as a result of denoising the central pixel of the arbitrary unit area.

The image denoising apparatus may further include: a transforming unit 808 configured to transform the image to be processed into a two-dimensional discrete cosine transform domain, so as to perform the preliminary denoising processing. Wherein, the preliminary denoising unit 802 performs the preliminary denoising processing according to a Wiener filtering algorithm.

The image denoising apparatus according to the present invention proposes an improved local non-mean value denoising method, and denoises the original image based on the residual quantity between the preliminarily denoised image and the original image, thereby reserving more detail information of the image, and making the denoised image looked more natural.

Furthermore, an embodiment of the present invention provides electronic equipment, comprising the above-described image denoising apparatus. In a particular implementation of the above-described electronic equipment according to the embodiment of the present invention, the above-described electronic equipment may be any piece of the following equipment: a computer, a tablet computer, a personal digital assistant, a multimedia playing device, a mobile phone, and an electronic book, etc. Wherein, the electronic equipment has various functions and technical effects of the above-described image denoising apparatus, which shall not be described herein any further.

The unit, sub-units and modules, etc., of the above-described image denoising apparatus according to the embodiment of the present invention may be configured in a manner of software, firmware, hardware, or any combination thereof. In a case where it is carried out by software or firmware, a program constituting the software or firmware may be installed from a storage medium or a network to a machine having a hardware architecture. When the machine is installed with various programs, the machine is capable of executing the functions of the above-described unit and sub-units.

Furthermore, the present invention provides a program product storing machine-readable instruction codes. When the instruction codes are read and executed by a machine, it may execute the above-described image denoising method according to the embodiment of the present invention. Correspondingly, various storage media carrying such a program product, such as a floppy disc, an optical disc, a magneto-optical disc, and a semiconductor memory, etc., are also covered by the disclosure of the present invention.

Furthermore, the methods of embodiments of the present invention are not limited to be carried out in the temporal orders described in the description or shown in the accompanying drawings, and may be carried out in parallel or independently in other temporal orders. Therefore, the technical scope of the present invention is not limited to the orders of carrying out the methods described in the description.

Furthermore, it is obvious that the operational processes of the above-described methods according to the present invention may be carried out by computer-executable programs stored in various machine-readable storage media.

And an object of the present invention may also be achieved in a manner as follows: providing the storage medium storing the above-described executable program codes directly or indirectly to a system or equipment, and reading and executing the above-described program codes by a computer or a central processing unit (CPU) in the system or equipment.

At this moment, the implementations of the present invention are not limited to a program, only if the system or equipment has a function of executing a program. And the program may be in any form, such as an object program, a program executed by an interpreter, or a script program provided to an operating system, etc.

The above-described machine-readable storage media include but not limited to: various memories and memory units, semiconductor devices, floppy disc units, such as an optical disc, a magnetic disc, and a magneto-optical disc, and other media suitable for storing information, etc.

What described above are preferred embodiments of the present invention, and are not intended to limit the present invention. Various modifications and variations may be made to the present invention by those skilled in the art. Any changes, equivalents, and improvement, etc., made within the spirits and principle of the present invention, are covered by the protection scope of the present invention.

In summary, in the embodiments according to the present invention, the present invention provides the following solutions, but it is not limited thereto.

Supplement 1. An image denoising method, comprising:
performing preliminary denoising processing to an acquired image to be processed, so as to obtain a preliminarily denoised image;
calculating a residual quantity corresponding to a central pixel of each unit area in the image to be processed according to numerical values of specific energy parameters to which the image to be processed and the preliminarily denoised image correspond, respectively; and
using the residual quantity to calculate a weight matrix corresponding to each unit area, and performing non-local mean value calculation to the image to be processed according to the weight matrix, so as to realize the denoising processing of the image to be processed.

Supplement 2. The image denoising method according to supplement 1, wherein a process of calculating the weight matrix comprises:
selecting an arbitrary unit area in the image to be processed, and determining an associated area of the arbitrary unit area in the image to be processed; and
calculating a weight value corresponding to each associated unit area according to a value of a distance between each associated unit area in the associated area and the arbitrary unit area and the residual quantity, so as to obtain the weight matrix.

Supplement 3. The image denoising method according to supplement 2, wherein the weight value corresponding to an arbitrary associated unit area in the associated area is calculated by using a formula below:

$$w(n,m)=e^{(-(d(n,m)+residuals(n,m))/h)};$$

where, w(n, m) is the weight value to which an arbitrary associated unit area (n, m) corresponds, d(n, m) is the value of the distance between the arbitrary associated unit area and the arbitrary unit area, residuals(n, m) is the residual quantity corresponding to the central pixel of the arbitrary unit area, h is a predefined control coefficient.

Supplement 4. The image denoising method according to supplement 3, wherein the value of the distance between the arbitrary associated unit area (n, m) and the arbitrary unit area (i, j) is calculated by using a formula below:

$$d(n, m) = \sum_{t=-r}^{r}\sum_{k=-r}^{r}\left((x(i+k, j+t) - x(n+k, m+t))^2 \bigg/ \left(\frac{(k^2+t^2)^{1.25} + 0.5}{T}\right)\right),$$

$$T = \sum_{t=-r}^{r}\sum_{k=-r}^{r}((k^2+t^2)^{1.25} + 0.5);$$

where, 2r+1 is a side length of the arbitrary associated unit area, and l, k and T are intermediate values.

Supplement 5. The image denoising method according to any one of supplements 2-4, wherein a process of the non-local mean value calculation comprises:
calculating a weighted sum of all pixels in the associated area according to a relationship between each associated unit area in the associated area and a weight value in the weight matrix, so as to take it as a result of denoising the central pixel of the arbitrary unit area.

Supplement 6. The image denoising method according to supplement 1, wherein the specific energy parameters comprise a gray scale value.

Supplement 7. The image denoising method according to any one of supplements 1-6, further comprising:
transforming the image to be processed into a two-dimensional discrete cosine transform domain, so as to perform the preliminary denoising processing.

Supplement 8. The image denoising method according to supplement 7, wherein the preliminary denoising processing is performed according to a Wiener filtering algorithm.

Supplement 9. An image denoising apparatus, comprising:
a preliminary denoising unit configured to perform preliminary denoising processing to an acquired image to be processed, so as to obtain a preliminarily denoised image;
a residual quantity calculating unit configured to calculate a residual quantity corresponding to a central pixel of each unit area in the image to be processed according to numerical values of specific energy parameters to which the image to be processed and the preliminarily denoised image correspond, respectively; and
a non-local mean value calculating unit configured to use the residual quantity to calculate a weight matrix corresponding to each unit area, and perform non-local mean value calculation to the image to be processed according to the weight matrix, so as to realize the denoising processing of the image to be processed.

Supplement 10. The image denoising apparatus according to supplement 9, wherein the non-local mean value calculating unit comprises:

an associated area determining unit configured to select an arbitrary unit area in the image to be processed, and determine an associated area of the arbitrary unit area in the image to be processed; and a weight matrix acquiring unit configured to calculate a weight value corresponding to each associated unit area according to a value of a distance between each associated unit area in the associated area and the arbitrary unit area and the residual quantity, so as to obtain the weight matrix.

Supplement 11. The image denoising apparatus according to supplement 10, wherein the weight matrix acquiring unit uses a formula below to calculate the weight value corresponding to an arbitrary associated unit area in the associated area:

$$w(n,m) = e^{(-(d(n,m)+residuals(n,m))/h)};$$

where, w(n, m) is the weight value to which an arbitrary associated unit area (n, m) corresponds, d(n, m) is the value of the distance between the arbitrary associated unit area and the arbitrary unit area, residuals(n, m) is the residual quantity corresponding to the central pixel of the arbitrary unit area, h is a predefined control coefficient.

Supplement 12. The image denoising apparatus according to supplement 11, wherein the value of the distance between the arbitrary associated unit area (n, m) and the arbitrary unit area (i, j) is calculated by using a formula below:

$$d(n, m) = \sum_{t=-r}^{r} \sum_{k=-r}^{r} \left( (x(i+k, j+t) - x(n+k, m+t))^2 \Big/ \left( \frac{(k^2 + t^2)^{1.25} + 0.5}{T} \right) \right),$$

$$T = \sum_{t=-r}^{r} \sum_{k=-r}^{r} ((k^2 + t^2)^{1.25} + 0.5);$$

where, 2r+1 is a side length of the arbitrary associated unit area, and l, k and T are intermediate values.

Supplement 13. The image denoising apparatus according to supplement 10, wherein the non-local mean value calculating unit includes:

a weighted sum calculating unit configured to calculate a weighted sum of all pixel in the associated area according to a relationship between each associated unit area in the associated area and a weight value in the weight matrix, so as to take it as a result of denoising the central pixel of the arbitrary unit area.

Supplement 14. The image denoising apparatus according to supplement 9, wherein the specific energy parameters comprise a gray scale value.

Supplement 15. The image denoising apparatus according to any one of supplements 9-14, further comprising:

a transforming unit configured to transform the image to be processed into a two-dimensional discrete cosine transform domain, so as to perform the preliminary denoising processing.

Supplement 16. The image denoising apparatus according to supplement 15, wherein the preliminary denoising unit performs the preliminary denoising processing according to a Wiener filtering algorithm.

Supplement 17. Electronic equipment, comprising the image denoising apparatus as described in any one of supplements 9-16.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image denoising method, comprising:
performing preliminary denoising processing of an acquired image to be processed, so as to obtain a preliminarily denoised image;
calculating a residual quantity corresponding to a central pixel of each unit area in the image to be processed according to numerical values of specific energy parameters to which the image to be processed and the preliminarily denoised image correspond, respectively, the residual quantity is an absolute value of a difference between a gray scale value of the acquired image to be processed and a gray scale value of the preliminarily denoised image; and
using the residual quantity to calculate a weight matrix corresponding to each unit area, and performing a non-local mean value calculation on the image to be processed according to the weight matrix to realize the denoising processing of the image to be processed.

2. The image denoising method according to claim 1, wherein the weight matrix calculation comprises:
selecting an arbitrary unit area in the image to be processed, and determining an associated area of the arbitrary unit area in the image to be processed; and
calculating a weight value corresponding to each associated unit area according to a value of a distance between each associated unit area in the associated area and the arbitrary unit area and the residual quantity to obtain the weight matrix.

3. The image denoising method according to claim 2, wherein the weight value corresponding to an arbitrary associated unit area in the associated area is calculated by:

$$w(n,m) = e^{(-(d(n,m)+residuals(n,m))/h)};$$

where, w(n, m) is the weight value to which an arbitrary associated unit area (n, m) corresponds, d(n, m) is the value of the distance between the arbitrary associated unit area and the arbitrary unit area, residuals(n, m) is the residual quantity corresponding to the central pixel of the arbitrary unit area, h is a predefined control coefficient.

4. The image denoising method according to claim 3, wherein the value of the distance between the arbitrary associated unit area (n, m) and the arbitrary unit area (i, j) is calculated by:

$$d(n, m) = \sum_{t=-r}^{r} \sum_{k=-r}^{r} \left( (x(i+k, j+t) - x(n+k, m+t))^2 \Big/ \left( \frac{(k^2 + t^2)^{1.25} + 0.5}{T} \right) \right),$$

$$T = \sum_{t=-r}^{r} \sum_{k=-r}^{r} ((k^2 + t^2)^{1.25} + 0.5);$$

where, 2r +1 is a side length of the arbitrary associated unit area, and l, k and T are intermediate values.

5. The image denoising method according to claim 2, wherein the non-local mean value calculation comprises:
calculating a weighted sum of all pixels in the associated area according to a relationship between each associated unit area in the associated area and a weight value in the weight matrix as a result of denoising the central pixel of the arbitrary unit area.

6. An image denoising apparatus, comprising:
a memory that stores a plurality of instructions; and
a processor coupled to the memory and configured to execute the instructions to:
perform preliminary denoising processing of an acquired image to be processed to obtain a preliminarily denoised image;
calculate a residual quantity corresponding to a central pixel of each unit area in the image to be processed according to numerical values of specific energy parameters to which the image to be processed and the preliminarily denoised image correspond, respectively, the residual quantity is an absolute value of a difference between a gray scale value of the acquired image to be processed and a gray scale value of the preliminarily denoised image; and
use the residual quantity to calculate a weight matrix corresponding to each unit area, and perform a non-local mean value calculation on the image to be processed according to the weight matrix to realize the denoising processing of the image to be processed.

7. The image denoising apparatus according to claim 6, wherein the processor is further configured to:
select an arbitrary unit area in the image to be processed, and determine an associated area of the arbitrary unit area in the image to be processed; and
calculate a weight value corresponding to each associated unit area according to a value of a distance between each associated unit area in the associated area and the arbitrary unit area and the residual quantity to obtain the weight matrix.

8. The image denoising apparatus according to claim 7, wherein the processor is further configured to uses a formula to calculate the weight value corresponding to an arbitrary associated unit area in the associated area, the formula comprising:

$$w(n,m) = e^{(-(d(n,m)+residuals(n,m))/h)};$$

where, w(n, m) is the weight value to which an arbitrary associated unit area (n, m) corresponds, d(n, m) is the value of the distance between the arbitrary associated unit area and the arbitrary unit area, residuals(n, m) is the residual quantity corresponding to the central pixel of the arbitrary unit area, $h$ is a predefined control coefficient.

9. The image denoising apparatus according to claim 8, wherein the value of the distance between the arbitrary associated unit area (n, m) and the arbitrary unit area (i, j) is calculated by:

$$d(n, m) = \sum_{t=-r}^{r} \sum_{k=-r}^{r} \left( (x(i+k, j+t) - x(n+k, m+t))^2 \Big/ \left( \frac{(k^2+t^2)^{1.25} + 0.5}{T} \right) \right),$$

$$T = \sum_{t=-r}^{r} \sum_{k=-r}^{r} ((k^2+t^2)^{1.25} + 0.5);$$

where, 2r +1 is a side length of the arbitrary associated unit area, and $i, k$ and $T$ are intermediate values.

10. The image denoising apparatus according to claim 7, wherein the processor is further configured to:
calculate a weighted sum of all pixels in the associated area according to a relationship between each associated unit area in the associated area and a weight value in the weight matrix as a result of denoising the central pixel of the arbitrary unit area.

* * * * *